Sept. 20, 1971     D. R. KURI     3,605,842
CUTTING TOOLS
Filed Aug. 26, 1968     2 Sheets-Sheet 1
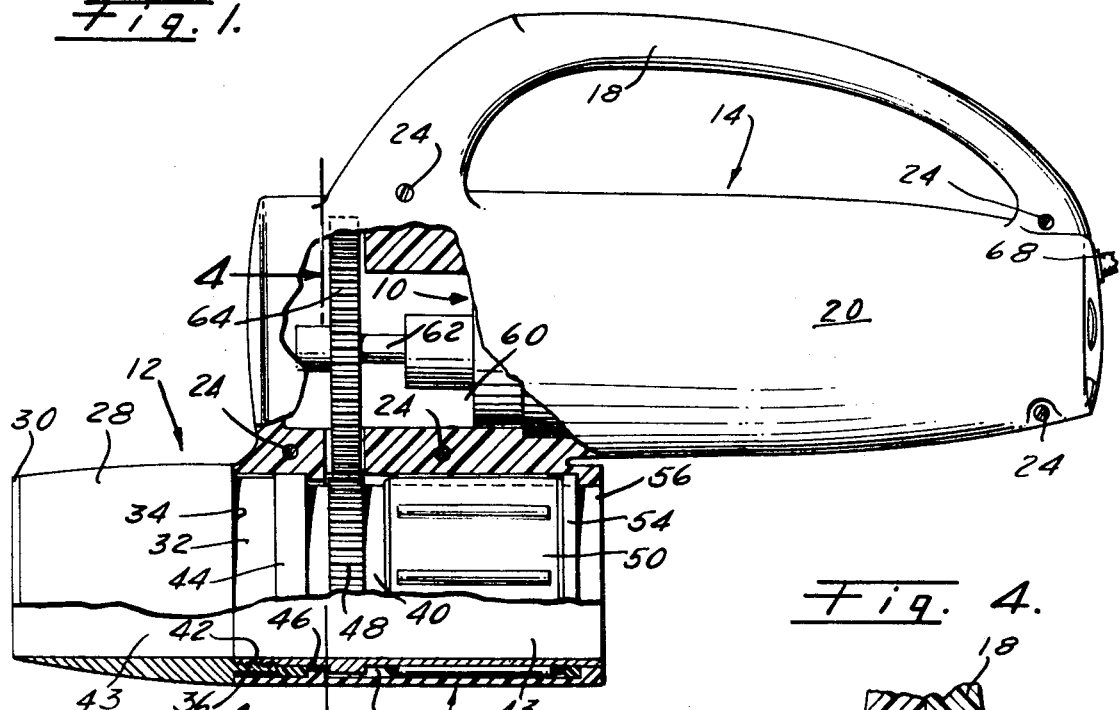
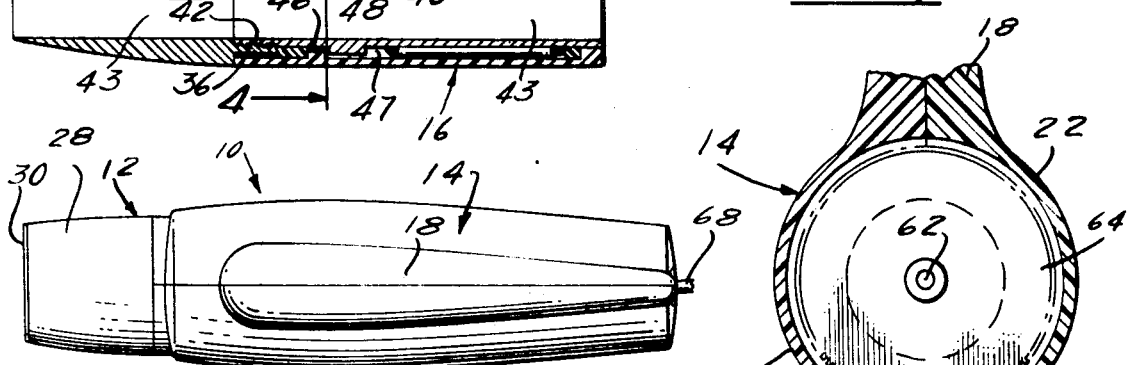
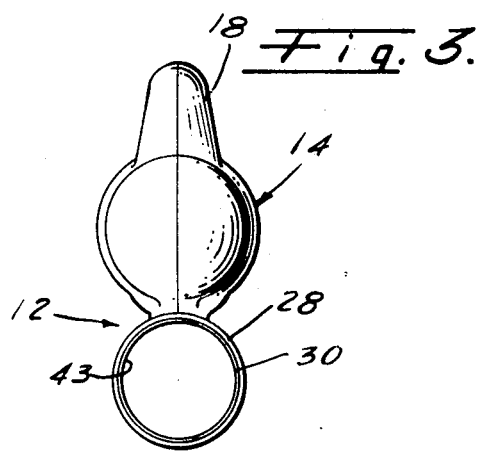
Donald R. Kuri
INVENTOR.
BY *J. C. Baisch*
Attorney Sept. 20, 1971     D. R. KURI     3,605,842
CUTTING TOOLS
Filed Aug. 26, 1968     2 Sheets-Sheet 2
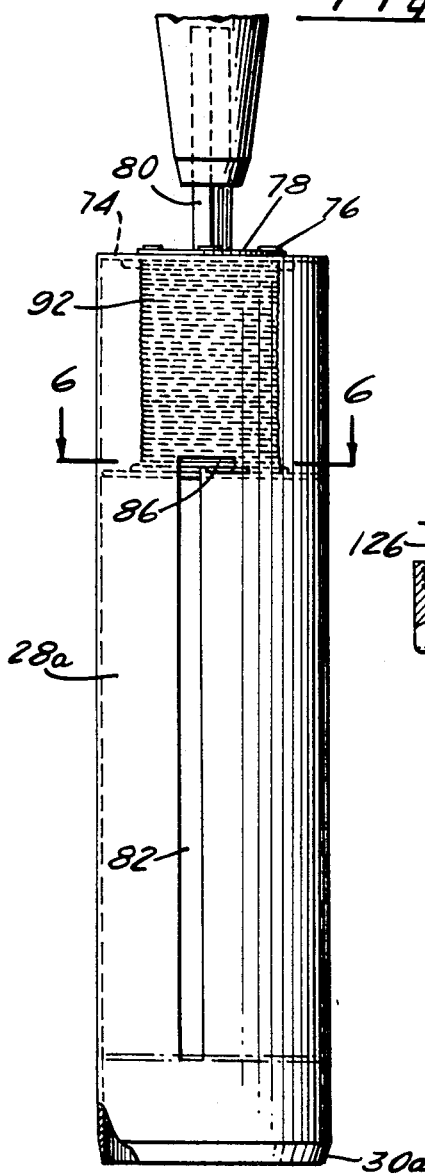
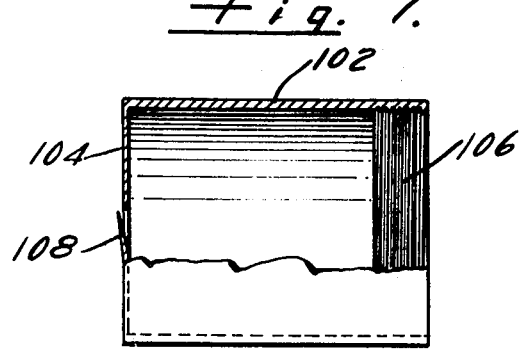
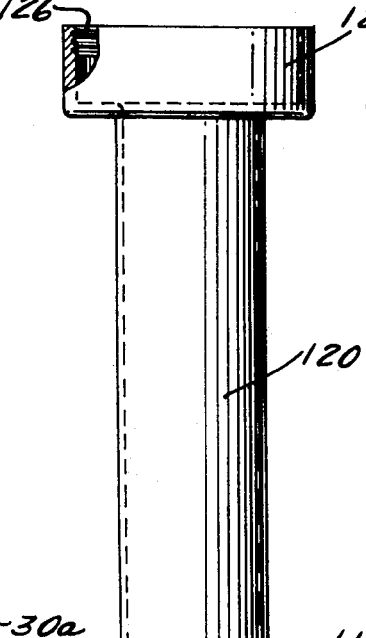
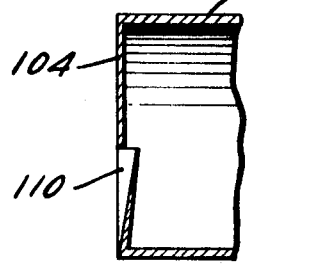
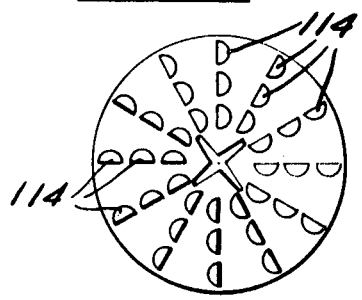
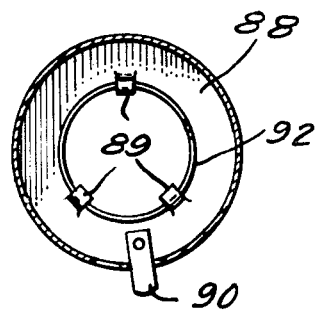
Donald R. Kuri
INVENTOR.
BY *J. Baisch*
Attorney United States Patent Office 3,605,842
Patented Sept. 20, 1971

3,605,842
CUTTING TOOLS
Donald R. Kuri, 19395 E. Dairen St.,
Rowland Heights, Calif. 91745
Filed Aug. 26, 1968, Ser. No. 755,046
Int. Cl. A47j 25/00; B26b 3/00
U.S. Cl. 146—203                                  1 Claim

ABSTRACT OF THE DISCLOSURE

Power operated cutting apparatus having a hollow, rotatable cylindrical blade with a sharp annular cutting edge at the leading end. An electric motor is connected to the blade for rotating same.

BACKGROUND OF THE INVENTION

Field of the invention

This invention relates generally to cutting tools and relates more particularly to power operated cutting tools for cutting and coring meat and other foods.

Description of the prior art

As far as I am aware, power operated food cutting tools of the prior art provide only straight blades for slicing flat pieces of meat and other foods. With such prior art cutting tools, it is difficult, if not impossible, to cleanly cut off meat close to the bones, and such devices cannot be used to core meat, fruit or vegetables, et cetera.

BRIEF SUMMARY OF THE INVENTION

The present invention comprises a rotatable, hollow cylindrical cutting blade having a sharp annular, or circular, cutting edge at the leading end and there is an electric motor geared to the blade for rotating same. Cut material passes through the cylindrical blade and both the motor and the blade supporting mechanism are enclosed in a unitary housing which has a handle.

The tool has many uses. For example, it can cut dowel shaped pieces from pieces of meat, such as roasts. The dowel shaped pieces can then be cut crosswise for shish-ka-bob, for example. It can also be used to core fruits and vegetables, clean meat off bones, cut meat and cheese discs for hors d'oeuvres, cut melon cores which, if desired, can then be cut into discs for salads and the like and cut ice cream cores.

OBJECTS OF THE INVENTION

It is an object of the invention to provide a multi-purpose power operated cutting tool for cutting meat of various kinds.

It is another object of the invention to provide a cutting tool that will core fruits and vegetables, et cetera.

It is still another object of the invention to provide a tool of this character that is easy to handle and effective in operation.

The characteristics and advantages of the invention are further sufficiently referred to in connection with the following detailed description of the accompanying drawings, which represent certain embodiments. After considering these examples, skilled persons will understand that variations may be made without departing from the principles disclosed, and I contemplate the use of any structures, arrangements, or modes of operation, that are properly within the scope of the appended claims.

Referring to the drawings, which are for illustrative purposes only:

FIG. 1 is a side elevational view of a power operated cutting tool embodying the invention, portions being broken away to show the interior construction;

FIG. 2 is a top plan view thereof;

FIG. 3 is a front elevational view;

FIG. 4 is a sectional view taken on line 4—4 of FIG. 1;

FIG. 5 is a side elevational view of an alternative cutter arrangement;

FIG. 6 is a sectional view taken on line 6—6 of FIG. 5;

FIG. 7 is a side elevational view with a portion broken away of another alternative cutter arrangement;

FIG. 8 is a fragmentary sectional view of another alternative cutter arrangement;

FIG. 9 is an end view of still another cutter arrangement; and

FIG. 10 is a side elevational view of another alternative cutter blade arrangement with parts broken away.

Referring more particularly to FIGS. 1 to 4, there is shown a cutting tool embodying the invention, said tool having a housing of plastic or any other suitable material stiff and strong enough for mounting a motor, indicated generally at 10, and the cutter blade support assembly, indicated generally at 12.

The housing part for the motor is indicated generally at 14 and the housing part for the cutter assembly is indicated generally at 16.

A handle 18 is provided at the top of the housing part 14 for the motor and the housing is shown and described as being formed of two opposed but corresponding halves 20 and 22. When placed together, the two halves of the housing enclose the motor and the cutter assembly. Each half of the housing is cast, molded or otherwise formed integrally and these parts are secured together by any suitable means such as screws 24.

The cutter assembly comprises a hollow, cylindrical blade 28, of any suitable well known material, preferably metal, the outer surface of which tapers somewhat toward its forward or leading end which is sharpened at 30. The sharp cutting end of the blade takes in the entire circumference of said leading end. In other words, the circular forward or leading end of the cylindrical cutting blade is a sharp cutting edge.

At the rear of the cylindrical blade 28 is a reduced diameter part 32 and there is a shoulder 34 at the forward end of the reduced diameter part 32 where it joins the body of the blade, that is that part of the blade that extends forwardly of the shoulder 34.

The part 32 is not only of reduced external diameter but is also of reduced internal diameter and tapped or internally threaded as at 36.

Blade 28 is carried or supported by a hollow, cylindrical supporting means or sleeve 40 which is of metal coated with a plastic such as Teflon, which is the trademark of the Du Pont Company for its fluorocarbon resins.

Any other suitable plastic material may be used or the sleeve 40 may be uncoated. The Teflon provides a protective coating and greatly reduces friction.

Sleeve 40 has an externally threaded forward end part 42 onto which the cutting blade is screwed. It is to be noted that the interiors of the cutter 28 and sleeve 40 form a continuous smooth walled passage 43 throughout the length of said cutter or cutting blade and said sleeve. An annular seal 44 is disposed on the sleeve 40 adjacent its forward end, said sleeve being of nylon or other suitable plastic or other material and bonded to the sleeve 40 by heat or by any suitable well known adhesive, such as a plastic adhesive or an epoxy cement. The rear edge of the seal 44 abuts against the forward end of an annular internal flange 46 within the cavity 47 defined by the housing part 16. At the opposite or rear end of the flange 46 is an annular gear 48 bonded or otherwise suitably secured on the sleeve 40. Gear 48 may be of nylon or other suitable plastic or of any other suitable material. By having the flange 46 between the seal 44 and the gear 48, the sleeve 40 is held against longitudinal displacement.

A needle bearing 50 of well known character is disposed within the cavity 47, defined by the part 16 of the housing, and a rear portion of said sleeve 40 is operably disposed within the needle bearing 50.

A seal 54 of nylon, or other suitable material, is bonded by any well known means to the sleeve 40 adjacent the rear end thereof and retains the needle bearing 50 against rearward displacement. At the rear end of the cavity defined by the housing part 16 there is an annular internal flange 56 which the seal 54 engages, said flange 56 being engaged by the seal 54 and said flange defines an opening that is larger than the interior passage through the cutter blade and sleeve 40, so that a dowel cut by the blade 28 and passing through said blade and the sleeve 40 may pass through the opening defined by said flange 56.

Motor 10 is shown as being an electric motor, although it may be a pneumatic or other type of motor, and is operably disposed within the cavity 60 defined by the housing part 14. Motor 10 has a drive shaft 62 on which a gear 64 is secured for meshing with the gear 48 on the sleeve 40. It is to be noted that there is an opening 66, FIG. 4, between the housing parts 14 and 16 through which said gears extend and in which they mesh. Electric current is supplied to the electric motor 10 by means of wires in electric cord 68, said wires being adapted to be connected to a source of electric current. A switch, not shown, controls current to the motor. When the motor is energized, the drive shaft 62 thereof rotates and rotates the cutter blade 28 through the gears 64 and 48.

When the blade is rotated, it may be used to cut dowels of meat, the dowels being cylindrical in shape and, as the blade is applied, the dowels pass through the hollow interior or passage through the blade 28 and the sleeve 40 and may pass outwardly through the opening defined by the flange 56. When the cut has been completed, the dowel may be removed from the device by turning the blade downwardly. If the dowel does not drop out by gravity, it may be readily removed manually by means of a fork, prongs or the like.

A few of the uses to which the tool may be put, besides cutting dowels from roasts and the like, are to clean meat off bones, cut meat and cheese discs for hors d'oeuvres, cut mellon cores which can be cut into discs for salads and the like, cut ice cream cores, et cetera.

Referring to FIG. 5, there is shown an alternative arrangement wherein the hollow cylindrical cutter, indicated at 28a, has a sharp circular cutting edge 30a at the leading free end, said cutter blade having a rear end wall 74 to which is secured, by means of rivets 76, a plate 78 attached to one end of a shaft 80, said shaft 80 being axially arranged relative to the cylindrical cutter blade, the opposite end of the shaft 80 being operably receivable in a socket of the drive mechanism of an electric beater. The motor of the beater rotates the blade 28a.

Blade 28a has a longitudinally extending slot 82 therein extending from a location adjacent the free, cutting end of the blade to a location adjacent to the opposite end. At the rear end of the slot 82 there is a lateral slot 86.

Slidable within the blade 28a is a plate 88 having an ear 90 attached thereto and extending radially outwardly through the slot 82. A spring 92 is disposed in the upper or rear end of the blade 28a and has one end secured to plate 88 by overturned ears 89, and reacts between the wall 74 and the plate 88 to yieldingly urge the plate 88 forwardly. When a dowel is to be cut from a piece of meat, for example, the plate 88 is manually moved inwardly, upwardly as seen in FIG. 5, by means of the ear 90, that is toward the rear wall 74 against the resistance of the spring 92. When the plate reaches the end of its rearward travel, the ear 90 is turned into lateral slot 86. The core is cut from a piece of meat. The blade is then removed from the beater mechanism and the ear 90 moved into alignment with the slot 82, whereupon the spring 92 effects ejection of the dowel or core within the blade 28a.

The cutter of FIG. 7 comprises a cylindrical body 102 having one end open and the other closed by a wall 104. The body is hollow and there is an internal portion 106 at the open end that is threaded. Wall 104 has a cutting ear or blade 108 stamped therefrom and bent outwardly. This ear or blade is sharpened along at least one edge. When it is desired to use the device of FIG. 7, the cutter 28 is removed from the sleeve 40 and the device of FIG. 7 screwed on sleeve 40. This blade may be used as a shredder of lettuce, cabbage, et cetera and also as an ice shaver.

The arrangement shown in FIG. 8 is similar to that of FIG. 7 except that a cutting blade 110 is stamped or cut from the cylindrical body 102 and is bent inwardly.

The blade shown in FIG. 8 may be used as dicers or slicers for onions, carrots, celery and other vegetables, or for doing the same thing for fruits.

In FIG. 9 the device is similar to that of FIGS. 7 and 8 but the end wall has a plurality of cutting blades 114 stamped and turned out of the plane or said end wall.

The cutting blades 114 may be bent inwardly or outwardly and the cutting device of this figure is for grating cheese, potatoes or the like. It is to be noted that there are crossed slots at the axial center of the device and there are cutting blades 114 at the peripheral edge so there will be no binding when the device is pushed into a piece of cheese or other food to be shredded. Blades 114 of alternate rows may also be staggered relative to the blades in adjacent rows.

In the arrangement of FIG. 10, there is a hollow, tubular cutting blade 120 that is relatively long and smaller in diameter than the blade 28. At one end, blade 120 is sharpened to provide a sharp circular cutting edge 122, extending circumferentially of the free edge of said blade 116. At the opposite end of blade 116, there is an enlarged diameter socket 124 which has internal threads 126, so the blade 120 may be screwed onto the sleeve 40.

The device of FIG. 9 may be used as a shredder for lettuce, cabbage, et cetera.

The blade of FIG. 10 is particularly adapted for coring. It may be used to cut cores from pieces of meat and it may be used to core fruit such as apples, et cetera.

I claim:

1. A cutting tool comprising:
   (A) a single hollow, cylindrical cutting blade having a sharp cutting edge at its leading end, said edge being normal to the axis of said blade;
   (B) means for rotatably supporting said cutting blade, said means comprising a hollow, rotatable supporting cylindrical sleeve, to one end of which the cylindrical cutting blade is attached; a cutting blade housing in which the cylindrical sleeve is rotatably disposed, and at least one bearing within the blade housing, said cylindrical sleeve being disposed within said bearing, and wherein the hollow, cylindrical supporting sleeve is plastic coated, and a plastic gear is bonded to said supporting sleeve; and (C) means for rotating said cutting blade, said means comprising a motor having a rotatable drive shaft; a gear secured to said drive shaft and meshed with the gear on the supporting sleeve; a motor housing for said motor, said gears being within said housing; and the housing for the blade-supporting sleeve being joined to the motor housing and offset to one side thereof, said motor housing and the housing for the blade supporting sleeve being divided in a pair of corresponding, opposed halves; and means for securing the housing together.

References Cited

UNITED STATES PATENTS

| | | | |
|---|---|---|---|
| 2,433,058 | 12/1947 | Mesaros. | |
| 3,512,519 | 5/1970 | Hall | 77—69X |
| 2,492,158 | 12/1949 | Le Compte et al. | |
| 2,530,063 | 11/1950 | Jagenburg | 146—6 |

WILLIE G. ABERCROMBIE, Primary Examiner

U.S. Cl. X.R.

146—52